United States Patent [19]

Berwanger et al.

[11] Patent Number: 4,970,872
[45] Date of Patent: Nov. 20, 1990

[54] BLOCKING VALVE FOR REFRIGERATION OR AIR CONDITIONING SYSTEMS

[76] Inventors: Egidio Berwanger; Marcos G. Schwarz, both of Joinville, Brazil

[73] Assignee: Empressa Brasileria de Compressores S/A-EMBRACO, Joinville SC, Brazil

[21] Appl. No.: 392,026

[22] Filed: Aug. 9, 1989

[30] Foreign Application Priority Data

Aug. 12, 1988 [BR] Brazil .............................. PI8804215
Feb. 16, 1989 [BR] Brazil .............................. PI8900773

[51] Int. Cl.$^5$ .............................................. F25B 41/04
[52] U.S. Cl. ............................................ 62/205; 62/222; 251/129.09
[58] Field of Search ............... 62/205, 207, 204, 190, 62/498, 222, 223; 251/129.09, 129.1, 129.21

[56] References Cited

U.S. PATENT DOCUMENTS 1,909,893  5/1933  Potter ............................... 62/204
2,856,484  10/1958  Fairbanks ...................... 251/129.1 X
4,843,833  7/1989  Polkinghorne ................... 62/187 X

FOREIGN PATENT DOCUMENTS 0003364  1/1981  Japan ............................. 251/129.1

Primary Examiner—Harry B. Tanner
Attorney, Agent, or Firm—Darby & Darby

[57] ABSTRACT

Blocking valve for refrigeration or air conditioning systems, of the type which includes: a hermetic compressor driven by an electric motor, a condenser, an evaporator, a capillary tube between the condenser and the evaporator, and a blocking valve between the condenser and the capillary tube. The blocking valve has a housing (42) defining an inside chamber with inlet and outlet passage in fluid communication with the condenser (31) and, respectively, with the capillary tube (32). A magnetic slide (41) installed in the chamber can be displaced between an opening position and a closure position of the valve. Electromagnetic elements (46, 47) assembled in the housing (42) are selectively and automatically energized during a period of time sufficient to cause the displacement of the slide (41) from one operating position to another in accordance with an operating condition of the system, the slide (41) being retained in its operating positions by action of non-electromagnetic forces.

21 Claims, 2 Drawing Sheets

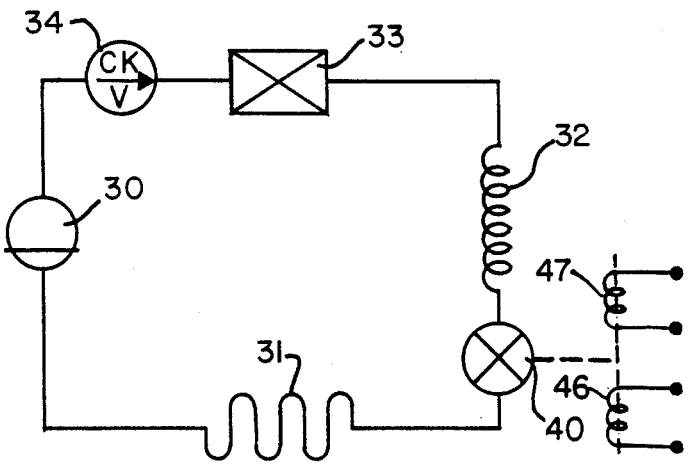
FIG. 1
FIG. 3
FIG. 2

FIG. 4
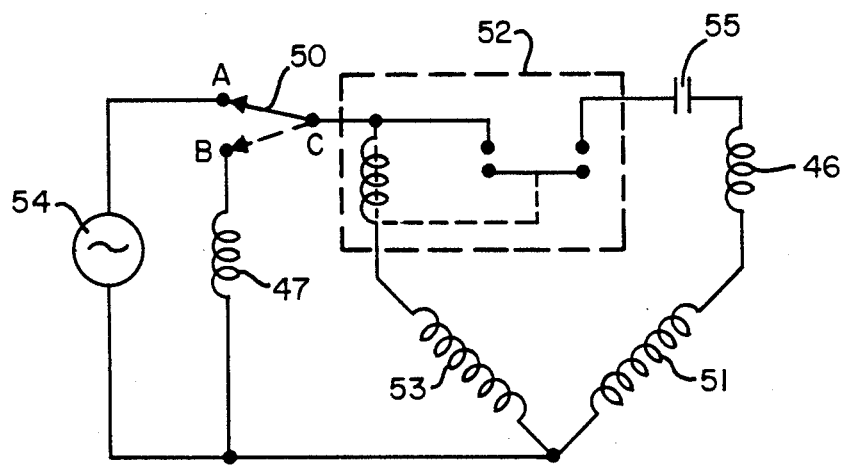
FIG. 5
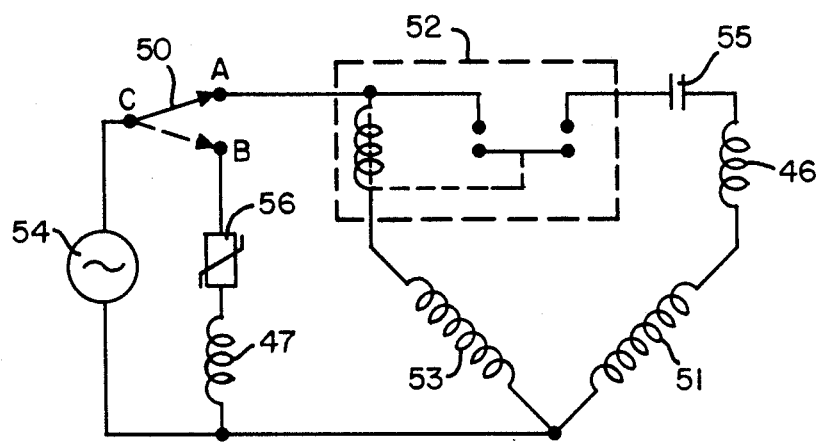
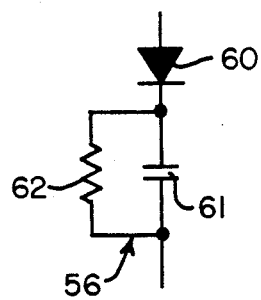
FIG. 6

BLOCKING VALVE FOR REFRIGERATION OR AIR CONDITIONING SYSTEMS

BACKGROUND OF THE INVENTION

This invention refers to refrigeration or air conditioning systems which use capillary tubes as a control element and, more specifically, to a blocking valve for these systems.

Refrigeration and air conditioning systems essentially consist of a compressor, a condenser, a capillary tube and an evaporator.

In these systems, when the evaporator temperature reaches a predetermined value and the compressor is switched off, there occurs the migration of the heated fluid from the condenser side (the high pressure side) to the evaporator (low pressure side). This migration of the refrigerant to the evaporator at each stop of the compressor causes a loss of the cooling capacity in the system (approximately 6% in systems which use reciprocating compressors and 12% in systems which use rotary compressors), since the refrigerant, besides heating the evaporator, must be compressed once again at each new start of the compressor, when the normal operation cycle of the system is reestablished, that is, when the pressure and temperature levels are reestablished in each unit of the system.

A first known solution to solve this problem involves the use of a solenoid valve, installed between the condensor and the capillary tube. In this type of system, the valve is energized simultaneously with the stop of the compressor (rotary compressor), preventing the refrigerant from flowing from the condenser to the evaporator.

One problem of this solution is that the valve remains energized during the stop of the refrigeration system, and consequently, during the stop of the compressor, consuming during that time a considerable amount of energy.

Another known solution is described in the patent document GB 2121942 A. This system includes a one-way valve (26) installed between the suction side (21a) of a compressor (21) and the evaporator (25) to prevent the refrigerant flow from the side of the suction to the evaporator. A pressure responsive type valve (37) is installed between the condenser and the evaporator (25) to prevent the flow of the fluid from the condenser (22) to the evaporator (25) during the stop of the compressor (21). A connection tube (34) is connected between the valve (37) and the suction side (21a) of the compressor (21) to transmit the pressure from the suction side to the valve. The closure of the valve (37) is controlled by the suction pressure from the compressor (21). When the compressor (21) suction pressure becomes higher than a given predetermined value, it acts on the valve (37) preventing the passage of the refrigerant fluid from the condenser to the evaporator.

This solution has the inconvenience that it can only be applied to refrigeration systems which use rotary compressors, since this valve (37) is controlled by the pressure of the refrigerant gas which returns through the suction line during compressor (21) stops.

This return of the refrigerant gas through the suction line after the compressor stops, occurs due to the constructive characteristics of the rotary compressors. In this type of compressor, the refrigerant gas, discharged at a high pressure into the housing, leaks through the mechanical assembly to the suction side, which effect is used to activate the valve (37).

In reciprocating compressors, this effect of the refrigerant gas leakage through the mechanical assembly to the suction line does not occur, thus making impossible the use of this type of valve in systems using reciprocating compressors. Another inconvenience of this solution is the number of welds to be performed in the tubing due to the requirement of at least one additional tube (34) in the refrigeration circuit. This tube (34) is required for measuring the pressure of the suction line (21a).

OBJECTS OF THE INVENTION

The objective of this invention is to provide a blocking valve for refrigeration and air conditioning systems which may be applied both in systems which use rotary compressors and in systems using reciprocating compressors.

A further objective of this invention is to provide a blocking valve for refrigeration and air conditioning systems which have a low power consumption.

Still another objective of this invention is to provide a blocking valve for refrigeration air conditioning systems, which does not require the installation of additional tubes in the mentioned systems, thus reducing the number of welding operations to a minimum.

BRIEF DESCRIPTION OF THE INVENTION

The above objectives are obtained with a blocking valve to be installed in refrigeration or air conditioning systems, of a type having a hermetic compressor driven by an electric motor; a condenser and an evaporator, connected, respectively, at the compressor discharge and suction sides. There also is a capillary tube type control element installed between the condenser and the evaporator; and a blocking valve between the condenser and the capillary tube.

According to this invention, the blocking valve comprises a housing defining an internal chamber with an inlet passage in fluid communication with the condenser and outlet passage in fluid communication with the evaporator. A magnetic slide is assembled inside the chamber, in a way that it can be displaced between a non-operative position, maintaining open the inlet and outlet passage and an operative position, sealing the outlet opening. Electromagnetic elements assembled to the housing are selectively and automatically energized, preferably by the electric motor circuit, for a period sufficient to cause the displacement of the magnetic slide valve from one operational position to another according to the energization of the compressor electric motor. The retention of the magnetic valve slide in its inoperative and operative positions is accomplished by the action of non-electromagnetic forces acting on the magnetic slide at least during the maintenance of same in the respective inoperative or operative position.

In a preferred form of the invention, the housing in which the magnetic slide is lodged has two tubular parts assembled concentrically. The internal tubular part is of a non-magnetic material and is externally provided with opening and closing coils. The external tubular part is of a ferromagnetic material and is externally assembled over the opening and closing coils which are fastened to the mentioned inner tubular part of the housing.

In this preferred form of invention, the opening coil is connected in series with the electric motor start winding. Consequently, the valve opening occurs simultaneously with the start of the motor, in which moment the opening coil is energized and the magnetic slide displaced to the opening position. The retention of the slide in this position occurs by the action of its own weight. The valve must, therefore, in this embodiment, be installed in a vertical position.

The closing coil is connected in parallel with the motor terminals (main winding) at the same time the motor is switched off. The closing of the valve consequently occurs simultaneously with the disconnection of the motor, when it acts as generator during its deceleration, causing an electric current to circulate through the closing coil, which displaces the magnetic slide to the closing position. The retention of the slide in this position is accomplished by the difference of pressure between the high and low pressure sides of the system.

The so constructed blocking valve presents a very reduced power consumption as, contrary to the conventional solution (solenoid valve), it does not remain energized during the standstill period of the system, but is only energized at the times the compressor stops and starts, which represents a fraction of a second.

Besides, in the above described configuration, the current consumption of the power supply system occurs only in the moment of the valve opening, whilst its closing is made at the expense of the power generated by the motor at the moment it is switched off and, therefore, without any consumption of current from the power supply.

Another advantage of the blocking valve is that it does not require the installation of additional tubings in the system, thus making unnecessary additional welding operations, which bring about more costs with tests and control.

Another advantage is that this valve is electrically driven, thus acting independently of the pressures of the system. This is why it can be applied in systems which use both rotary and alternative compressors.

BRIEF DESCRIPTION OF THE DRAWINGS

The invention will be hereafter described with reference to the enclosed drawings, where:

FIG. 1 is a schematic representation of a refrigeration system which uses a blocking valve in accordance with the invention;

FIG. 2 represents a longitudinal sectional view of the blocking valve of this invention;

FIG. 3 illustrates a sectional view taken according to line III—III of FIG. 2;

FIGS. 4 and 5 represents two electric circuits of the valve, together with the compressor start devices; and FIG. 6 illustrates a structural variation of the circuit shown in FIG. 5.

DETAILED DESCRIPTION OF THE INVENTION

As shown in FIG. 1, the refrigeration system has a hermetic compressor 30, a condenser 31, a capillary tube 32 and a evaporator 33. In systems using rotary compressors a one-way valve 34 (check valve) is usually installed between the compressor 30 and the evaporator 33. The function of this valve is to prevent the passage of the heated refrigerant gas from the housing of the compressor 30 to the evaporator 33 in moments of stoppage, of the system.

In order to avoid the passage of the refrigerant gas from the condenser 31 to the evaporator 33 through the capillary tube 32, during the compressor stoppage periods, the system uses a blocking valve 40 installed, in the example shown in the illustration, between the condenser 31 and the capillary tube 32.

As shown in FIGS. 2 and 3, the blocking valve 40 has a magnetic slide 41 which is moving inside the housing 42. The housing 42 is formed by an inner round tubular part 42a and an outside round tubular part 42b, concentrically assembled. As shown in the illustration, the inner tubular parts 42a is externally provided with opening 46 and closing 47 coils for producing an electromagnetic field. The outside tubular part 42b is assembled over the opening 46 and closing 47 coils, radially fastened to the inner tubular part 42a by means of an intermediate ring 48 and a pair of end disks 42a by means of an intermediate ring 48 and a pair of end disks 49a and 49b, these latter defining, together with the inner tubular part 42a, a chamber in the inside of which slide 41 shifts.

One aspect regarding the construction of the housing 42 is that the inner tubular part 42a must be of a non-magnetic material, whilst the outside tubular part 42b, the ring 48 and the disks 49a and 49b must be of magnetic material in order that the electromagnetic fields from coils 46, 47 acts on the slide 41 of valve 40 (see the flow lines represented in FIG. 2). The housing 42 is connected to the condenser 31 (the high pressure side of the system) by means of the holes 43 in the disk 49b and to the evaporator 33 (low pressure side of the system) by means of the end 44 of the capillary tube 32.

The magnetic slide 41 is provided with a sealing surface 45, which in its closing position is seated on end 44 of the capillary tube 32, closing the passage of the refrigerant to the evaporator 33. As shown in FIG. 3, the magnetic slide 41 has a preferably square cross section with chamfered edges, so that the slide 41 may shift freely between its two positions without compressing the refrigerant fluid inside the chamber. Other polygonal forms of the section may be adopted in the construction of the slide 41.

The valve is operated by means of the circuits shown in FIGS. 4, 5 and 6.

According to what is shown in FIG. 4, the electric circuit for operation of the blocking valve 40, is made up, in the illustrated preferred form, the blocking valve, by closing coil 47 and opening coil 46 and a two-way switch 50, connected to the electric circuit of the motor, which has a start winding 51, starting device 52, main winding 53 and operates from a power source 54. The electric circuit of the motor normally includes a starting capacitor 55 connected in series with the starting winding 51. The two-way switch 50 is normally operated by the system thermostat.

The blocking valve opening takes place at the moment the motor starts when the starting switch 52 permits the temporary circulation of the current through the blocking valve opening coil 46, which is connected in series with the start winding 51 of the motor. By the temporary energizing of the opening coil 46, slide 41 is displaced to the position shown in FIG. 2, i.e. with its sealing end 45 separated from the refrigerant fluid outlet opening or end 44 of the capillary tube 32 which leads to the evaporator 33. When deenergizing the start winding of the motor and, consequently, the opening coil 46, the slide 41 remains in its non-operative or valve opening position due to the action of its own weight, as the valve is assembled so as to have its inside chamber arranged at least approximately in a vertical manner. It should be, however, understood that the slide 41 can be kept in its inoperative position by the pressure balance at the inlet and outlet openings of the chamber, supported by the provision of any mechanical device able to exert a slight elastic force on the slide, so as to force it lightly and constantly into the inoperative position.

The closure of the blocking valve 40 occurs at the moment the motor is switched off, when the two-way switch 50 shifts from position A to position B, connecting in parallel the closure coil 47 of the valve 40 with the main winding 53 of the motor, when the latter is still in deceleration movement. During this deceleration period, the motor acts as a power generator, imposing the temporary circulation of a current through the blocking valve closure coil 47 generated by the main winding 53. This causes the displacement of the slide 41 by magnetic attraction up to the closure position.

One of the alternative forms of the electric circuit required to operate the blocking valve 40, is shown in FIG. 5. In this circuit, the closure coil 47 is connected in series with a temporizing device 56 of the PTC (positive temperature coefficient) type.

The opening of the blocking valve 40 occurs in the same way as the one previously described with basis on the circuit of FIG. 4.

The closure of the blocking valve 40 in this alternative circuit form takes place after the disconnection of the motor, when the two-way switch 57 shifts from position A to position B, connecting the power source 54 to the closure circuit.

When connected to the power source 54, the closure coil 47 is energized displacing the slide 41 to the closure position. The temporizing device 56, which in this case is a PTC element, makes that the circulation of the current increase through the closure coil 47 temporary, limiting after a certain time the current value to a rather lower value that the initial one.

One variation of this temporizing device 56 is shown in FIG. 6. This circuit has a diode 60 connected in series with a capacitor 61 and with a discharge resistor 62, the capacitor 61 and the discharge resistor being connected in parallel.

With the deenergizing of the closure coil 47, after the complete stop of the motor according to the configuration of FIG. 4 or after the period established by the temporizer 56 according to the embodiments of FIGS. 5 and 6, slide 41 remains in its operative position of valve closure by action of the pressure differential existing between the high and low pressure sides of the system. The opening of fluid outlet 44 from the valve chamber is dimensioned so as to warranty the application of a closing force on the slide 41 which is greater than the sum of all forces acting on the slide in the sense to separate it from the closure position in the condition of the deenergized opening coil 46.

It should further be understood that the opening and closing electromagnetic forces which act on the slide are dimensioned to provide the safe displacing of the slide to its respective operating positions and further that the activation period of these forces are dimensioned to permit that the conditions of pressure in the system are reached, which are particular to each of the two operating conditions of same, represented by "compressor operating" and "compressor at standstill".

We claim:

1. Blocking valve for refrigeration or air conditioning systems, of the type which includes a hermetic compressor driven by an electric motor; a condensor and an evaporator, respectively connected to the compressor discharge and suction sides; a capillary tube type control element between the condensor and the evaporator; and a blocking valve between the condenser and the control element, the blocking valve comprises
    a housing defining an inside chamber with an inlet opening in fluid communication with the condenser and with an outlet opening in fluid communication with the evaporator by means of the control element;
    a sealing magnetic slide installed inside the chamber for displacement between a non-operative or valve opening position and an operative or valve closure position by sealing the outlet opening;
    electromagnetic elements in the housing and selectively and automatically energized during a time sufficient to cause the displacing of the magnetic slide from one operating condition to another, according to the operating condition of the system, the retention of the magnetic slide in its non-operative and operative positions being accomplished by action of non-electromagnetic forces acting on the magnetic slide at least during the periods in which same remains in the respective operating position.

2. Blocking valve for refrigeration or air conditioning systems, according to claim 1, wherein the retention of the slidable valve means in the non-operative valve opening position is performed by action of its own weight.

3. Blocking valve for refrigeration or air conditioning systems, according to claim 1, wherein the retention of the slidable valve means in the operating or valve closure position is accomplished by the pressure differential between the high and low pressure sides of the system.

4. Blocking valve for refrigeration or air conditioning systems, according to claim 1, wherein the housing comprises an inner tubular part, an outside tubular part; a pair of end walls closing the two tubular parts and an intermediate ring, said end walls and said intermediate ring interconnecting radially the two tubular parts and the electromagnetic field producing means being assembled between the two tubular parts, an each of the two sides of the intermediate ring.

5. Blocking valve for refrigeration or air conditioning systems, according to claim 4, wherein the inside tubular part is made of non-magnetic materials, and the outside tubular part, the end walls and the intermediate ring are made of ferromagnetic material.

6. Blocking valve for refrigeration or air conditioning systems, according to claim 1, wherein the housing has an end pull and the inlet and outlet passages are installed in the end wall.

7. Blocking valve for refrigeration or air conditioning systems, according to claim 6, wherein the outlet passage is defined by the projection of the capillary tube towards the inside of the valve chamber.

8. Blocking valve for refrigeration or air conditioning systems, according to claim 4, wherein the slidable valve has a sealing element on its extreme contact surface for contact with the outlet passage.

9. Blocking valve for refrigeration or air conditioning systems, according to claim 1, wherein the energization of the electromagnetic field producing means is made from the electric circuit of the compressor motor.

10. Blocking valve for refrigeration or air conditioning systems, according to claim 9, wherein the motor has a main winding, a starting, winding and a starting device, and the electromagnetic field producing means comprise: a valve opening coil connected in series with the auxiliary winding and with the motor starting device so that it is energized simultaneously with the start of the electric motor, and a valve closure coil connected to be automatically energized simultaneously with the deenergizing of the motor.

11. Blocking valve for refrigeration or air conditioning systems, according to claim 10, wherein the closure coil is automatically connected in parallel with the main winding of the motor at the moment of deenergizing of the latter, so as to be energized by the current generated by the electric motor during the deceleration of the rotor.

12. Blocking valve for refrigeration or air conditioning system, according to claim 10, wherein the closure coil is connected in series with the temporizing device which deenergizes the closure coil after a period of time had passed from the deenergizing of the electric motor.

13. Blocking valve for refrigeration or air conditioning systems, according to claim 12, wherein the temporizing device comprises a PTC type element.

14. Blocking valve for refrigeration or air conditioning system, according to claim 12, wherein the temporizing device an electronic circuit formed by a diode connected in series with a capacitor and a discharge resistor, the capacitor and the discharge resistor being connected in parallel.

15. Blocking valve for refrigeration or air conditioning systems, according to claim 10, wherein the energizing of the closure coil is controlled by a switch provided in the compressor motor supply electric circuit and automatically activated in accordance with one operating condition of the system.

16. Blocking valve for refrigeration or air conditioning systems, according to claim 15, wherein the operating condition of the system is a temperature condition of the system.

17. Blocking valve for refrigeration or air conditioning systems, according to claim 4, wherein the inlet and outlet passages are in the chamber end wall.

18. Blocking valve for refrigeration or air conditioning systems, according to claim 11, wherein the energizing of the closure coil is controlled by a switch provided in the compressor motor supply electric circuit and automatically activated in accordance with one operating condition of the system.

19. Blocking valve for refrigeration or air conditioning systems, according to claim 12, wherein the energizing of the closure coil is controlled by a switch provided in the compressor motor supply electric circuit and automatically activated in accordance with one operating condition of the system.

20. Blocking valve for refrigeration or air conditioning systems, according to claim 13, wherein the energizing of the closure coil is controlled by a switch provided in the compressor motor supply electric circuit and automatically activated in accordance with one operating condition of the system.

21. Blocking valve for refrigeration or air conditioning systems, according to claim 14, wherein the energizing of the closure coil is controlled by a switch provided in the compressor motor supply electric circuit and automatically activated in accordance with one operating condition of the system.

* * * * *

UNITED STATES PATENT AND TRADEMARK OFFICE
CERTIFICATE OF CORRECTION

PATENT NO. : 4,970,872

DATED : November 20, 1990

INVENTOR(S) : Egidio Berwanger and Marcos G. Schwarz

It is certified that error appears in the above—identified patent and that said Letters Patent is hereby corrected as shown below:

ON TITLE PAGE: Item [73]
The name of the Assignee is incorrectly spelled.

Please change the name of the Assignee from:

"Empressa Brasileria de Compressores S/A - EMBRACO" to read as follows:

--Empresa Brasileira de Compressores S/A - EMBRACO".

Signed and Sealed this

Twelfth Day of May, 1992

Attest:

DOUGLAS B. COMER

*Attesting Officer*     Acting Commissioner of Patents and Trademarks